US007110991B2

(12) United States Patent
Arnold et al.

(10) Patent No.: US 7,110,991 B2
(45) Date of Patent: Sep. 19, 2006

(54) IDE INTEGRATION WITH JDBC

(75) Inventors: Jeremy Alan Arnold, Rochester, MN (US); Eric Lawrence Barsness, Pine Island, MN (US); Richard Dean Dettinger, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 10/092,987

(22) Filed: Mar. 7, 2002

(65) Prior Publication Data

US 2003/0172076 A1  Sep. 11, 2003

(51) Int. Cl.
*G06F 17/30* (2006.01)
(52) U.S. Cl. .................... 707/2; 707/3; 707/4; 707/102
(58) Field of Classification Search ................ 707/2–4, 707/100, 10, 102
See application file for complete search history.

(56) References Cited

U.S. PATENT DOCUMENTS

| 5,421,008 | A | * | 5/1995 | Banning et al. ............... 707/4 |
| 5,822,750 | A | * | 10/1998 | Jou et al. ........................ 707/2 |
| 5,832,481 | A | * | 11/1998 | Sheffield ......................... 707/4 |
| 5,873,084 | A | | 2/1999 | Bracho et al. ................. 707/10 |
| 5,974,417 | A | | 10/1999 | Bracho et al. ................. 707/10 |
| 6,003,030 | A | | 12/1999 | Kenner et al. ................. 707/10 |
| 6,055,492 | A | | 4/2000 | Alexander, III et al. ..... 702/179 |
| 6,118,940 | A | | 9/2000 | Alexander, III et al. ..... 395/704 |
| 6,154,744 | A | | 11/2000 | Kenner et al. ................. 707/10 |
| 6,236,997 | B1 | * | 5/2001 | Bodamer et al. ............. 707/10 |
| 6,249,791 | B1 | * | 6/2001 | Osborn et al. ............... 707/200 |
| 6,266,666 | B1 | | 7/2001 | Ireland et al. ................. 707/10 |
| 6,292,822 | B1 | | 9/2001 | Hardwick .................... 709/105 |
| 6,298,475 | B1 | | 10/2001 | Alcorn .......................... 717/4 |
| 6,643,652 | B1 | * | 11/2003 | Helgeson et al. ............. 707/10 |
| 2003/0088541 | A1 | * | 5/2003 | Zilio et al. ..................... 707/1 |
| 2003/0093408 | A1 | * | 5/2003 | Brown et al. .................. 707/2 |

FOREIGN PATENT DOCUMENTS

DE        199257235        7/2000

OTHER PUBLICATIONS

Oracle, Oracle Enterprise Manager Database Tuning with the Oracle Tuning Pack, 1999-2001, Exhibit I (pp. 1-7), Exhibit II (pp. 1-4), Exhibit III (pp. 1-11), Exhibit IV (pp. 1-62).*
$3^{rd}$ IFCIS International Conference on Cooperative Information Systems, The International Foundation on Cooperative Information Systems, New Jersey Institute of Technology, Aug. 20-22, 1998, New York City, NY, pp. 177-186.

(Continued)

*Primary Examiner*—Cam-Y Truong
(74) *Attorney, Agent, or Firm*—Patterson & Sheridan (57) ABSTRACT

The present invention is directed to a method and apparatus of providing programming assistance for an integrated development environment. In one embodiment, a code portion is received. An attempt to retrieve a structured query language (SQL) statement that corresponds with the line code is then made. A recommendation based on the code portion for restructuring the corresponding SQL statement is then generated. The recommendation may include a modified SQL statement, referred to as a recommended SQL statement or a textual spoken language recommendation.

17 Claims, 4 Drawing Sheets

OTHER PUBLICATIONS

DBMS, Tools & Strategies for IS Professionals, IBM's Enterprise Strategy, Building the Interactive Enterprise, Special Report ODBC Update, ODBC Branches Out, Ken North, Apr. 1996, pp. S4-S9.

Concurrrency: Proactive and Experience (Conc. Pract. Exp.), vol. 10, Nos. 11-13, Sep.-Nov. 1998, pp. 1131-1141.

* cited by examiner

IDE INTEGRATION WITH JDBC

BACKGROUND OF THE INVENTION

1. Field of the Invention

The present invention generally relates to integrated development environments. More particularly, the present invention relates to providing programming assistance in integrated development environments.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Historically, databases were implemented in a two-tier client-server architecture in which a database was managed by a database server. In such an architecture, the database server was accessed by clients executing appropriate logic. More recently, a three-tier architecture has become popular. In a three-tier architecture the client does not directly access a DBMS. Rather, client requests are received by an application server which then takes steps to access a backend database.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's Access, and database products from Oracle, Sybase, and Computer Associates. The term "query" denominates a set of commands for retrieving data from a stored database. Queries take the form of a command language that lets programmers and programs select, insert, update, find out the location of data, and so forth. In addition, SQL provides a programming interface.

Often, programs used to access a database are written in Java. Java is an object-oriented programming language developed by Sun Microsystems, Inc. The developers of Java intended the language to be platform-neutral. That is, they intended for Java programs to be developed on any first computer, and then executed on any second computer, independent of the operating systems controlling either of the computers.

In the case where a Java program requires access to a database, the program can employ Java Database Connectivity (JDBC) and its associated JDBC drivers. JDBC is an application program interface (API) specification for connecting programs written in Java to the data in a database. Through JDBC, programs written in Java may access many popular databases using standard SQL protocol. More specifically, a Java program can use JDBC to establish a connection with a database, send SQL statements to the database, process a result from the database and return a result to the Java program. JDBC is a call-level interface, meaning that it consists of a set of function calls in a high-level application programming language, such as C, C++ or Java. A JDBC driver implements an API that supports a particular database system. An application program may call JDBC functions to store, retrieve or delete data. In response to these calls, the driver generates SQL statements that are suited to the particular database management system.

A pervasive concern with Java is its lack of performance capabilities as compared to procedural languages, and even other object oriented languages. As a result, much effort is spent on trying to improve its performance capabilities, particularly its capability of accessing a database through JDBC. One specific area that needs significant improvement is the manner in which calls to services, such as SQL, through JDBC are made. Java codes are often developed and executed without regard to their corresponding SQL statements' capability, which creates unnecessary objects and performance inefficiency when the calls are made.

A significant need, therefore, exists in the art for improved methods and apparatus for accessing database through JDBC.

SUMMARY OF THE INVENTION

The present invention generally is directed to a method of providing programming assistance for an integrated development environment. In one embodiment, a code portion is received. An attempt to retrieve a structured query language (SQL) statement that corresponds with the line code is then made. A recommendation based on the code portion for restructuring the corresponding SQL statement is then generated. The recommendation may include a modified SQL statement, referred to as a recommended SQL statement or a textual spoken language recommendation.

In another embodiment, the present invention is directed to a computer-readable medium containing a program which, when executed by a processor, performs an operation providing programming assistance for an integrated development environment. The operation includes the following steps: receiving a code portion; attempting to retrieve a corresponding structured query language (SQL) statement that corresponds with the code portion; and generating a recommendation based on the code portion for restructuring the corresponding SQL statement.

In yet another embodiment, the present invention is directed to a computer that includes a memory containing a programming assistance program for an integrated development environment; and a processor which, when executing the programming assistance program, performs an operation. The operation includes the following steps: receiving a code portion; attempting to retrieve a corresponding structured query language (SQL) statement that corresponds with the code portion; and generating a recommendation based on the code portion for restructuring the corresponding SQL statement.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are

DETAILED DESCRIPTION OF THE PREFERRED EMBODIMENTS

The present invention generally is directed to a development environment in which SQL statements are recommended to application developers as they are developing the code, e.g., using Java. In one embodiment, the recommendations are based on an analysis of the actual code to determine whether any SQL statements recommendations can be made. If so, then SQL statements that reflect on how the data that is to be used in the application are recommended. Thus, by using the recommended SQL statements, access through JDBC calls can be made more efficiently. Since database access is typically responsible for a large part of the CPU consumption in Java applications, using the recommended SQL statements will improve the Java application's performance.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

In some embodiments, the present invention is implemented for a Java environment. As an object-oriented programming language, Java includes the constructs of class, object, member variables and methods. A class is a template for defining the characteristics of a specific set of data structures and routines. The variables and routine defined by the class are respectively known as member variables and methods. When a program wishes to use those specific data structures and routines, the program instantiates the class, and then creates an object of the class. Each object, therefore, is an instance of a particular class or subclass with the class's own methods and data variables. The methods provide the computer instructions that manipulate the data contained in the object. However, the present invention is not limited to Java environments. Rather, the invention may be used to advantage in any environment presenting similar conditions and elements as those described therein with respect to Java.

Figure 1:
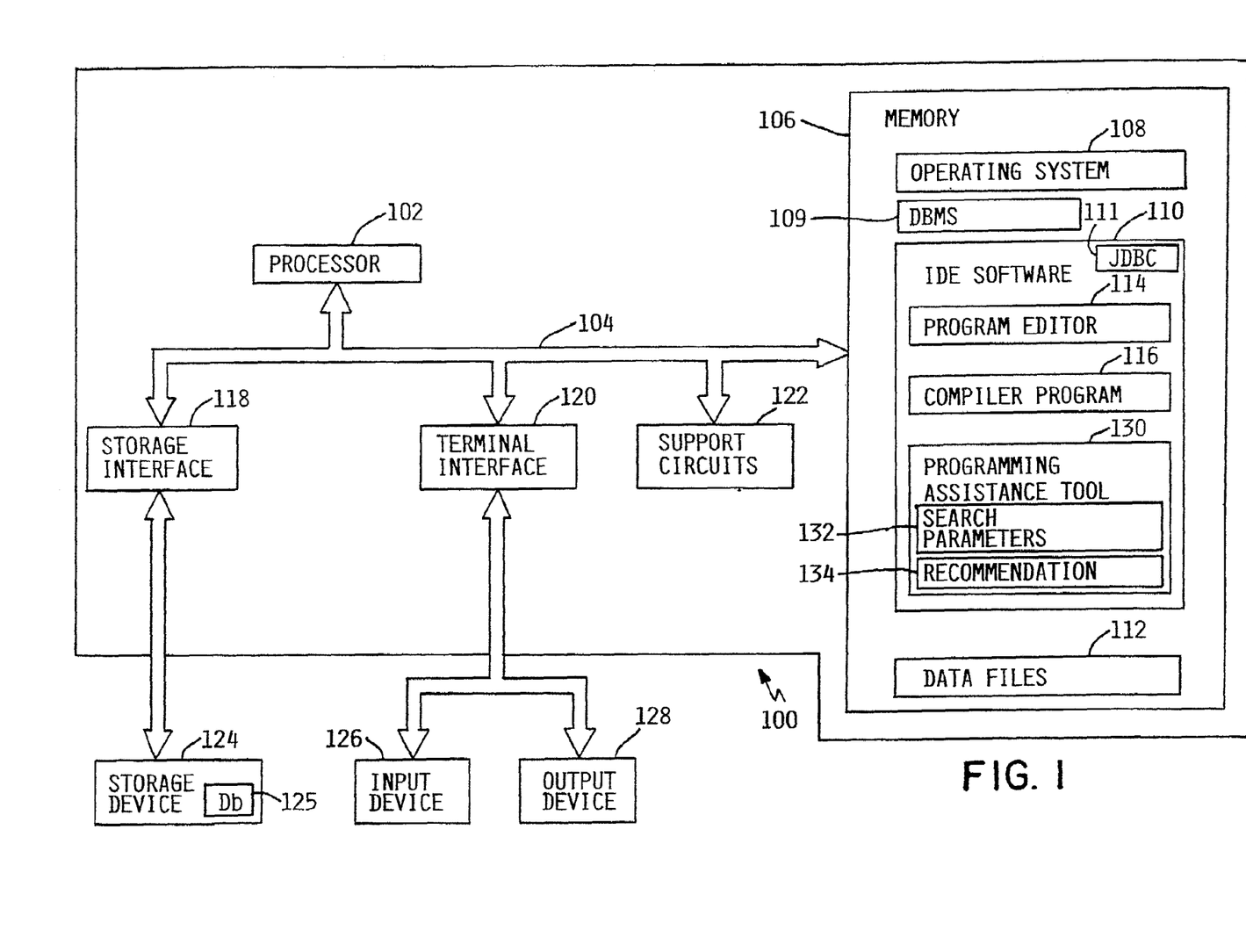
FIG. 1 is a computer system illustratively utilized in accordance with the invention.

FIG. 1 depicts a computer system 100 illustratively utilized in accordance with the invention. The computer system 100 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 100 is an eServer iSeries 400 available from International Business Machines of Armonk, New York Illustratively, the computer system 100 comprises a standalone device. However, the computer system 100 may also comprise a device coupled to a computer network system. In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The computer system 100 includes at least one processor 102, which obtains instructions and data from a main memory 106 via a bus 104. The computer system 100 is generally coupled to a number of peripheral devices. Illustratively, the computer system 100 is coupled to a storage device 124, input devices 126, and output devices 128. Each of the peripheral devices is coupled to the computer system via respective interfaces. For example, the computer system 100 is coupled to the storage device 124 via a storage interface 118, and is coupled to the input device 126 and the output device 128 via a terminal interface 120. The support circuits 122 include devices that support the operation of the computer system 100. Examples of support circuits 122 include a power supply, a clock, and the like.

The input device 126 can be any device adapted to give input to the computer system 100, for example, a keyboard, keypad, light-pen, touch-screen, track-ball, or speech recognition unit. The output device 128 is preferably any conventional display screen (e.g., computer monitor). Although shown separately from the input device 125, the output device 130 and input device 125 could be combined. For example, a display screen with an integrated touch-screen, and a display with an integrated keyboard or a speech recognition unit combined with a text speech converter could be used. In one embodiment, the storage device 124 is a direct access storage device (DASD). In another embodiment, the storage device 124 includes a database 125. Although it is shown as a single unit, it could be a combination of fixed and/or removable storage devices, such as fixed disc drives, floppy disc drives, tape drives, removable memory cards, or optical storage.

The main memory 106 may comprise one or a combination of memory devices, including Random Access Memory (i.e., RAM), nonvolatile or backup memory, (e.g., programmable or Flash memories, read-only memories, and the like). In addition, the main memory 106 may include memory physically located elsewhere in a computer system 100, for example, any storage capacity used as virtual memory or stored on a mass storage device or on another computer coupled to the computer system 100 via bus 104. While the main memory 106 is shown as a single entity, it should be understood that main memory 106 may in fact comprise a plurality of modules, and that the main memory 106 may exist at multiple levels, from high speed registers and caches to lower speed but larger DRAM chips. Further, the main memory 106 and storage device 124 could be part of one virtual address space spanning multiple primary and secondary storage devices.

The memory 106 is shown configured with an operating system 108. The operating system 108 is the software used for managing the operation of the computer system 100. Examples of the operating system 108 include IBM OS/400, UNIX, Microsoft Windows, and the like.

The memory 106 further includes a DBMS 109 for storing and retrieving data. In one embodiment the DBMS 109 is configured to store and retrieve data from IBM's DB2.

The memory 106 further includes Integrated Development Environment (IDE) software 110 which includes programming that enables a programmer to develop computer programs and software. In addition, the main memory 106 may contain various files 112 used with the IDE software 110. The files 112 include any file used or created while executing the IDE software 110. Examples of files 112 include source code, object code, byte codes, output data, and the like. The source code may be written in a programming language such as C, C++, Pascal, Java, and the like. For purposes of illustration, embodiments of the invention will be described with reference to Java. Accordingly, the IDE software 110 further includes a JDBC API 111. However, the invention is not limited to a particular language.

In one embodiment, the IDE software 110 includes a program editor 114, a compiler program 116, and a programming assistance tool 130. The program editor 114 is a software application that enables a programmer to write and edit computer programs in the form of source code. In one embodiment, the editor 114 is adapted to display prompts received from the programming assistance tool 130 to aid the programmer or user in software development. The editor 114 may be any type of editor adapted to output the source code and to display prompts on the output device 128, such as a computer monitor. In one embodiment, the programming assistance tool 130 is adapted to analyze a Java code based on the search parameters 132, determine whether a recommendation can be made as to improving its corresponding SQL statements, and if so, provide the programmer with a recommendation 134, including one or more recommended SQL statements and the textual spoken language recommendation. In one embodiment, the Java codes are methods that call via JDBC. The compiler 116 is a software program that interprets and converts the source code into object code. The compiler 116 then compiles the source code into object code. The object code comprises one or more programs or files used by the operating system 108 or an application program (not shown).

In general, the routines executed to implement embodiments of the invention, whether implemented as part of an operating system or a specific application, component, program, object, module or sequence of instructions will be referred to herein as the IDE software 110, or software 110. The software 110 typically comprises one or more instructions that are resident at various times in various memory and storage devices in the computer system 100. When read and executed by one or more processors 102 in the computer system 100, the software 110 causes that computer system 100 to perform the steps necessary to execute steps or elements embodying the various aspects of the invention.

Figure 2:
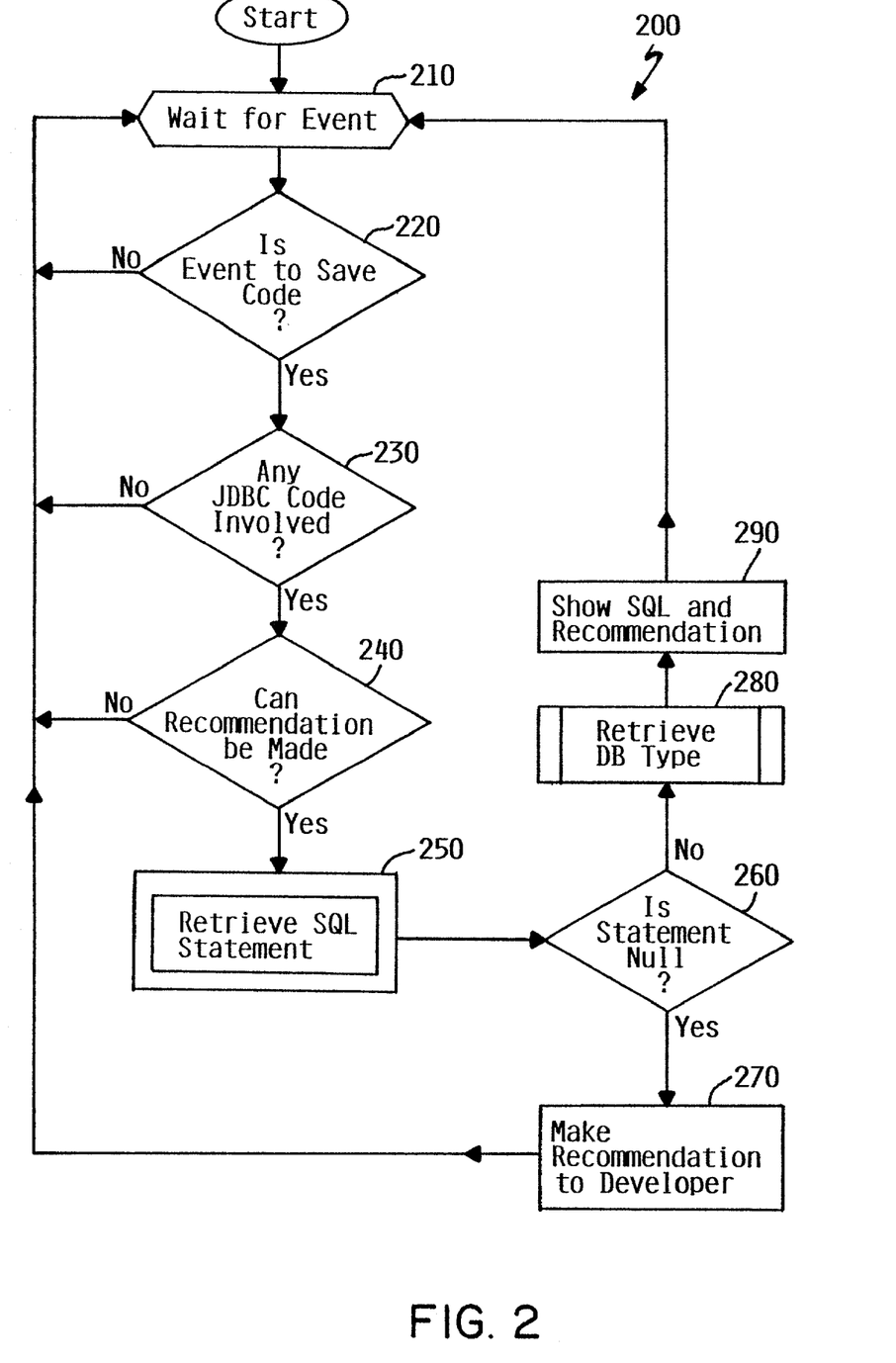
FIG. 2 is a method illustrative of an operation of the programming assistance tool in accordance with an embodiment of the present invention.

Referring now to FIG. 2, a method 200 illustrative of an operation of the programming assistance tool 130 in accordance with an embodiment of the present invention is shown. At step 210, the programming assistance tool 130 waits for an event. In one embodiment, an event is defined as an action or signal by the application developer. At step 220, a determination is made as to whether the event is to save the code, which indicates that either a new code has been developed/written or an existing code has been modified. If the event is not to save code, processing proceeds to step 210. If the event is to save code, a determination (at step 230) is made as to whether the code is in a JDBC format. In one embodiment, the JDBC code is a line code (or, more generally, any code portion) configured to retrieve independent fields from a database, such as, getString or getTimestamp.

If the code is not a JDBC code, then processing continues to step 210. However, if the code is in a JDBC format, then a determination (at step 240) is made as to whether a recommendation can be made to the developer with regard to the code, i.e., whether the code and its corresponding SQL statement can be revised so as to process the code more efficiently. In making that determination, how the data will be used in the application is taken into account. Specific examples of recommendations will be discussed in the following paragraphs.

If a recommendation can be made, then the corresponding SQL statement to the code that is to be executed is retrieved at step 250, which will be discussed in detail with reference to FIG. 3. If no recommendation can be made, then processing continues to step 210.

At step 260, a determination is made as to whether the corresponding SQL statement is a null statement indicating that the SQL statement was not successfully retrieved. If so, then a recommendation (at step 270) is made to the developer. In one embodiment, the recommendation is in a textual spoken language that informs the developer as to how the developer can modify the code so as to process the code more efficiently, such as, putting a certain function or operation in the SQL statement rather than in the code. Processing then continues to step 210. In one embodiment, the recommendation is displayed on a graphical user interface (GUI).

On the other hand, if the corresponding SQL statement is successfully retrieved, then (at step 280) the database type is retrieved so as to provide the proper syntax for the recommended SQL statement. Details of step 280 will be discussed with reference to FIG. 4. Once the database type is retrieved, the recommended SQL statement 134 is displayed, at step 290. Processing then continues to step 210. In one embodiment, the SQL statement that corresponds to the code is also displayed so that the developer can see the difference between the original SQL statement and the recommended SQL statement 134. In another embodiment, the SQL statements are displayed via a GUI along with a textual spoken language recommendation. Specific examples of recommended SQL statements that will facilitate understanding of the invention will be discussed in the following paragraphs.

Figure 3:
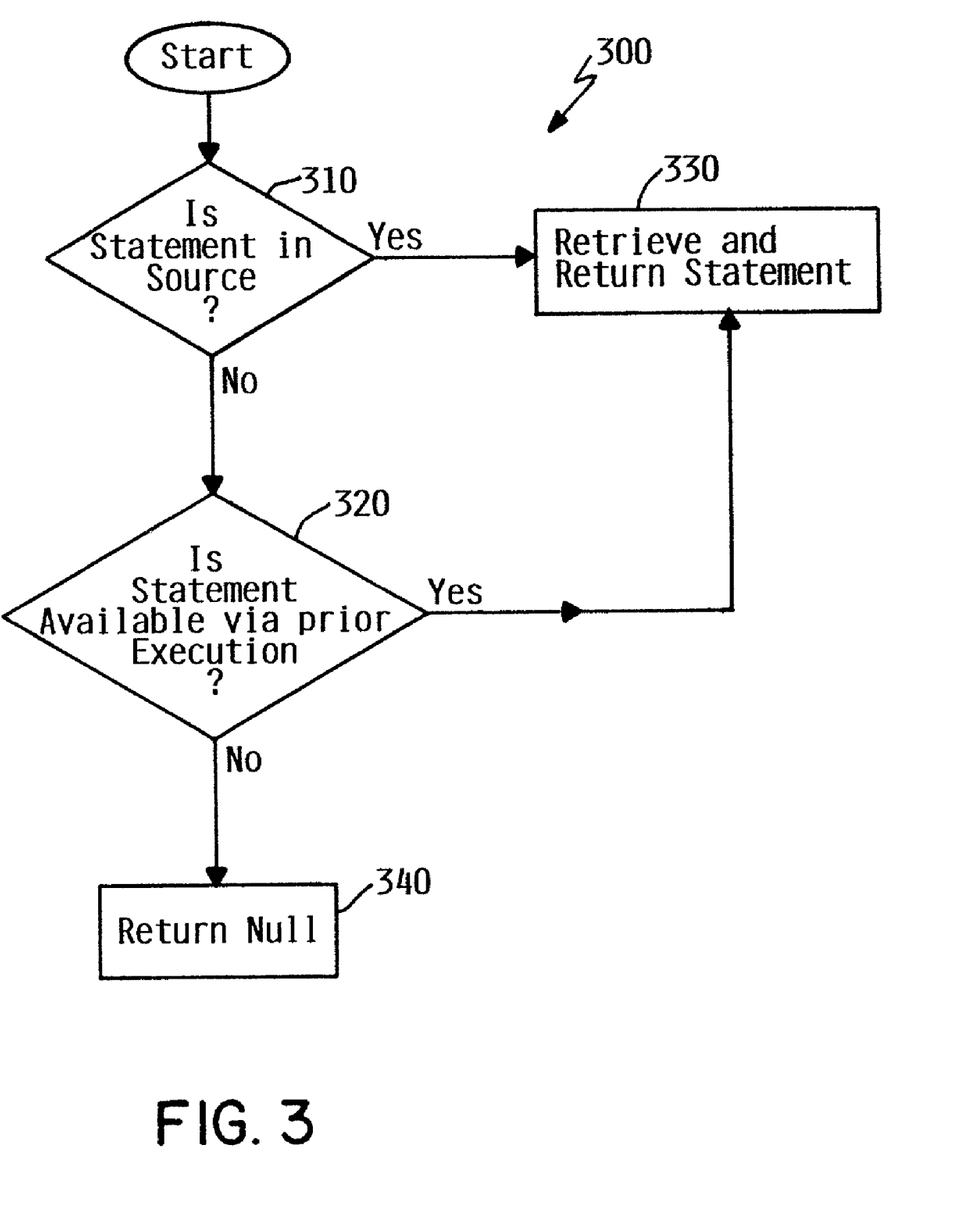
FIG. 3 is a method illustrative of the SQL statement-retrieval operation in accordance with an embodiment of the present invention.

Referring now to FIG. 3, a method 300 illustrative of the SQL statement-retrieval operation (step 250 described above) in accordance with an embodiment of the present invention is shown. At step 310, a determination is made as to whether the SQL statement is written in the code, i.e., hardcoded in the method itself. If so, the SQL statement is retrieved and returned for further processing in the method 200, as shown at step 330. If not, a determination is made as to whether the SQL statement can be retrieved from a prior execution of the same code, as shown at step 320. In one embodiment, every time a code is executed, its corresponding SQL statement is captured and saved for future use. If the SQL statement can be retrieved from a prior execution of the same code, then processing proceeds to step 330, which has been previously described. If the SQL statement could not be retrieved from a prior execution of the same code, a null statement is returned for further processing in the method 200, as indicated by step 340.

Figure 4:
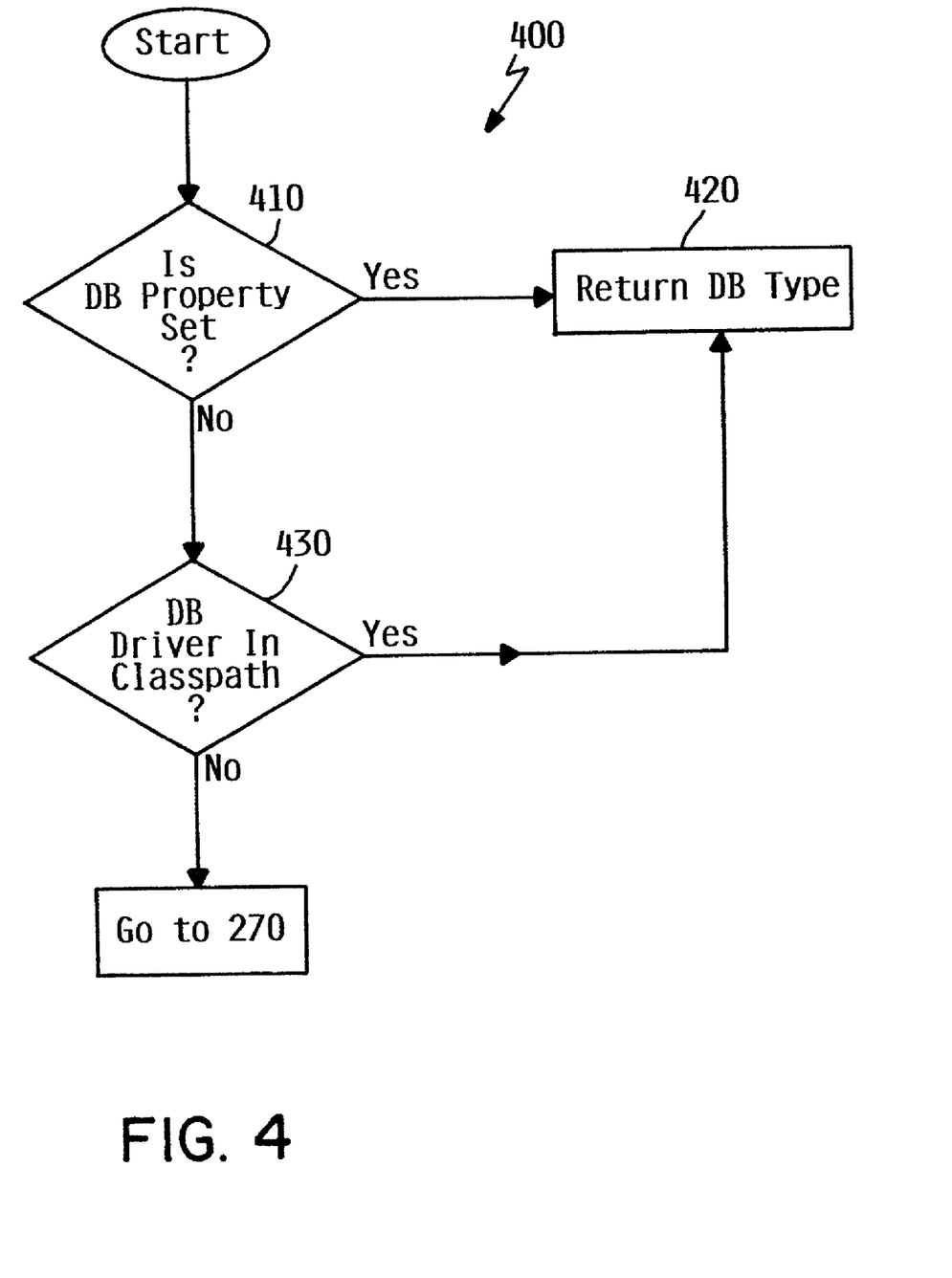
FIG. 4 is a method illustrative of the database type-retrieval operation in accordance with an embodiment of the present invention.

Referring now to FIG. 4, a method 400 illustrative of the database type-retrieval operation (step 280 described above) in accordance with an embodiment of the present invention is shown. At step 410, a determination is made as to whether a database property is specified in the IDE software 110. If so, the database property is returned as the database type to step 280, as indicated by step 420. If not, a determination is made as to whether a particular database driver can be identified from the class path, as indicated by step 430. If the particular database driver can be identified from the class path, then processing continues to step 420 at which the database driver is returned as the database type. If the particular database driver cannot be identified from the class path, then processing continues to step 270. In one embodiment, a default database type is retrieved from the IDE software 110 and returned as the database type to step 280.

If and when a recommended SQL statement is produced and displayed to a user, the user may then modify the corresponding Java code portion. Specifically, the Java code portion can be abbreviated or otherwise modified to avoid processing obviated by the recommended SQL statement. In one embodiment, the modified Java code portion may be programmatically generated and provided (i.e., displayed) to the user.

Specific examples of line codes, their corresponding SQL statements and the recommended SQL statements in accordance with several embodiments of the present invention will be described below.

EXAMPLE 1

Sample Java code 1: fld1=getString(1).trim( );
Corresponding SQL statement of sample Java code 1: "Select Field1 from table"
Recommended SQL statement: "Select trim(Field1) from table"
Sample Java code 1 is configured to retrieve the value of the first field from a record, thus creating a field object, and trim the blank spaces prior to and subsequent to the value, thus creating a trim object. The retrieval operation is executed by its corresponding SQL statement. However, the trimming operation is performed by the code. By including the trimming operation in the code, sample Java code 1 generates unnecessary objects, which slows down its execution. The recommendation, therefore, is to include the trimming operation in the SQL statement. By using the recommended SQL statement, both the retrieval and the trimming operations are performed by the SQL statement. Using the recommended SQL statement, sample Java code 1 may be rewritten as fld1=getString(1).

EXAMPLE 2

Sample Java code 2: fld2=getTimestamp(1).toString( );
Corresponding SQL statement of sample Java code 2: "Select timestamp 1 from table"
Recommended SQL statement: "Select CHAR(timestamp1) from table"
Sample Java code 2 is configured to retrieve the timestamp field from a database, thus creating a timestamp object, and convert the field to a string, thus creating a string object. The retrieval operation of the timestamp field is executed by the corresponding SQL statement. However, the conversion operation of the timestamp field to a string is performed by the code. By including the conversion operation in the code, sample Java code 2 generates unnecessary objects, which slows down its execution. The recommendation, therefore, is to include the conversion operation in the SQL statement. By using the recommended SQL statement, therefore, both the retrieval and the conversion operations are performed by the SQL statement. Using the recommended SQL statement, sample Java code 2 may be rewritten as fld2=getString(1).

EXAMPLE 3

Sample Java code 3: fld3=getString(1); int xx=String.parseInt(fld3)
Corresponding SQL statement of sample Java code 3: "Select field1 from table"
Recommended SQL statement: "Select INT(field1) from table"
Sample Java code 3 is configured to retrieve the value of the first field in a record, thus creating a string object, and parse the value of the first field into an integer, thus creating an integer object. The retrieval operation is executed by its corresponding SQL statement. However, the parsing/conversion operation of the value of the first field into an integer is performed by Java. By including the parsing/conversion operation in the code, sample Java code 3 generates unnecessary objects, which slows down its execution. The recommendation, therefore, is to include the parsing/conversion operation in the SQL statement. By using the recommended SQL statement, both the retrieval and the parsing/conversion operations are performed by the SQL statement. Using the recommended SQL statement, sample Java code 3 may be rewritten as int xx=getInt(1).

EXAMPLE 4

Sample Java code 4: fld4=getString(1); fld5=getString(2); String str=fld4+""+fld5;
Corresponding SQL statement of sample Java code 3: "Select field1, field2 from table"
Recommended SQL statement: "Select field1 ||''||field2 from table"
Sample Java code 4 is configured to retrieve the value of the first field in a record, thus creating a string object, retrieve the value of the second field, thus creating another string object, and concatenate the two strings together. The retrieval operations are executed by its corresponding SQL statement. However, the concatenation operation is performed by Java. By including the concatenation operation in the code, sample Java code 4 generates unnecessary objects, which slows down its execution. The recommendation, therefore, is to include the concatenation operation in the SQL statement. By using the recommended SQL statement, both the retrieval and the concatenation operations are performed by the SQL statement. Using the recommended SQL statement, sample Java code 4 may be rewritten as string str=getString(1).

The above sample Java codes merely illustrates several examples of recommendations in accordance with an embodiment of the present invention. The invention therefore is not limited by the number of recommendations.

While the foregoing is directed to embodiments of the present invention, other and further embodiments of the invention may be devised without departing from the basic scope thereof, and the scope thereof is determined by the claims that follow.

What is claimed is:

1. A method of providing programming assistance, comprising:
   providing an integrated development environment configured to recommend optimizations of source code;
   receiving a selected fragment of source code, wherein the source code fragment includes a source code statement that references a result of a structured query language statement (SQL);
   retrieving the SQL statement corresponding to the source code statement;
   presenting a user interacting with the integrated development environment with a recommendation for optimizing the retrieved SQL statement, relative to the source code statement, wherein the recommendation comprises one of a recommended SQL statement and a textual spoken language recommendation; and
   prior to retrieving the corresponding SQL statement, determining whether the fragment of source code can be modified to be processed efficiently by substituting the corresponding SQL statement with the recommended SQL statement.

2. The method of claim 1, further comprising displaying the recommendation.

3. The method of claim 1, further comprising displaying the corresponding SQL statement and the recommended SQL statement.

4. The method of claim 1, wherein the recommended SQL statement performs at least one function performed by the fragment of source code.

5. The method of claim 1, further comprising, prior to generating the recommended SQL statement, retrieving a database type for providing a proper syntax for the recommended SQL statement.

6. The method of claim 1, wherein the fragment of source code is configured to retrieve independent fields from a database.

7. The method of claim 1, wherein the fragment of source code is in Java.

8. The method of claim 1, wherein retrieving the corresponding SQL statement comprises retrieving the corresponding SQL statement from a prior execution of the fragment of source code.

9. The method of claim 1, wherein retrieving the corresponding SQL statement comprises retrieving the corresponding SQL statement from a repository of predefined SQL statements.

10. A computer-readable storage medium containing a program which, when executed by a processor, performs an operation for providing programming assistance for an integrated development environment, the operation comprising:
    receiving a selected fragment of source code, wherein the source code fragment includes a source code statement that references a result of a structured query language statement (SQL);
    retrieving the SQL statement corresponding to the source code statement;
    presenting a user interacting with the integrated development environment with a recommendation for optimizing the retrieved SQL statement, relative to the source code statement, wherein the recommendation comprises one of a recommended SQL statement and a textual spoken language recommendation; and
    prior to retrieving the corresponding SQL statement, determining whether the fragment of source code can be modified to be processed efficiently by substituting the corresponding SQL statement with the recommended SQL statement.

11. The computer-readable storage medium of claim 10, further comprising displaying the recommendation.

12. The computer-readable storage medium of claim 10, further comprising displaying the corresponding SQL statement and the recommended SQL statement.

13. The computer-readable storage medium of claim 10, wherein the fragment of source code is configured to retrieve independent fields from a database.

14. A computer for providing programming assistance, comprising:
    a memory containing a programming assistance program for an integrated development environment to recommend optimizations of source code; and
    a processor which, when executing the programming assistance program, performs an operation comprising:
    receiving a selected fragment of source code, wherein the source code fragment includes a source code statement that references a result of a structured query language statement (SQL);
    retrieving the SQL statement corresponding to the source code statement;
    presenting a user interacting with the integrated development environment with a recommendation for optimizing the retrieved SQL statement, relative to the source code statement, wherein the recommendation comprises one of a recommended SQL statement and a textual spoken language recommendation; and
    prior to retrieving the corresponding SQL statement, determining whether the fragment of source code can be modified to be processed efficiently by substituting the corresponding SQL statement with the recommended SQL statement.

15. The computer of claim 14, further comprising a display device and wherein the operation further comprises displaying the recommendation on the display device.

16. The computer of claim 14, further comprising displaying the corresponding SQL statement and the recommended SQL statement.

17. The computer of claim 14, wherein the fragment of source code is configured to retrieve independent fields from a database.

* * * * *